(12) United States Patent  
Nam et al.

(10) Patent No.: US 11,049,498 B2
(45) Date of Patent: Jun. 29, 2021

(54) METHOD FOR GENERATING CHATBOT UTTERANCE BASED ON SEMANTIC GRAPH DATABASE

(71) Applicant: AKA AI Co., Ltd., Seoul (KR)

(72) Inventors: Hooram Nam, Seoul (KR); Aleksei Prokopev, Seoul (KR); Myung Won Jung, Santa Monica, CA (US)

(73) Assignee: AKA AI Co., Ltd., Seoul (KR)

( * ) Notice: Subject to any disclaimer, the term of this patent is extended or adjusted under 35 U.S.C. 154(b) by 270 days.

(21) Appl. No.: 16/168,574

(22) Filed: Oct. 23, 2018

(65) Prior Publication Data

US 2020/0020325 A1 Jan. 16, 2020

(30) Foreign Application Priority Data

Jul. 12, 2018 (KR) .................. 10-2018-0081230

(51) Int. Cl.
*G10L 15/18* (2013.01)
*G10L 15/22* (2006.01)
*G06F 17/17* (2006.01)
*G06F 16/31* (2019.01)
*G06F 40/205* (2020.01)

(52) U.S. Cl.
CPC ........ *G10L 15/1815* (2013.01); *G06F 16/322* (2019.01); *G06F 17/175* (2013.01); *G06F 40/205* (2020.01); *G10L 15/22* (2013.01); *G10L 2015/223* (2013.01)

(58) Field of Classification Search
CPC ..... G10L 15/1815; G10L 15/00; G10L 15/06; G10L 15/07; G10L 15/10; G10L 15/18; G10L 15/197; G10L 15/28; G10L 15/187; G10L 15/22; G10L 2015/223; G10L 15/26; G10L 15/265; G10L 15/30; G10L 2015/088; G06F 17/2785; G06F 40/30; G06F 16/26; G06F 16/322; G06F 16/3329; G06F 16/367; G06F 16/90335; G06F 17/175; G06F 17/2755; G06F 17/278; G06F 17/2881; G06F 17/30654; G06F 17/3071; G06F 40/205; G06F 40/211; G06F 40/268; G06K 9/00718; H04L 51/02

See application file for complete search history.

(56) References Cited

U.S. PATENT DOCUMENTS

| | | | |
|---|---|---|---|
| 8,700,404 B1* | 4/2014 | Chotimongkol | .... G10L 15/1815 704/257 |
| 9,069,750 B2* | 6/2015 | Zuev | ....................... G06F 40/20 |
| 10,776,411 B2* | 9/2020 | Dechu | ................. G06F 16/3326 |
| 2005/0256700 A1* | 11/2005 | Moldovan | ............... G06F 40/30 704/9 |
| 2005/0278325 A1* | 12/2005 | Mihalcea | ............ G06F 16/3344 |
| 2008/0275694 A1* | 11/2008 | Varone | ..................... G06F 40/30 704/9 |

(Continued)

FOREIGN PATENT DOCUMENTS

KR 10-2017-0099969 A 9/2017

*Primary Examiner* — Abdelali Serrou
(74) *Attorney, Agent, or Firm* — Studebaker & Brackett PC (57) ABSTRACT

Disclosed is a method for generating an utterance of a chatbot based on a semantic graph database and executed by a computer, includes generating the semantic graph database by using a past utterance of a user, and generating the utterance of the chatbot for responding to a new utterance of the user, by using the semantic graph database.

13 Claims, 7 Drawing Sheets

(56) References Cited

U.S. PATENT DOCUMENTS

| | | | |
|---|---|---|---|
| 2009/0240714 A1* | 9/2009 | Keith | G06F 40/30 |
| 2015/0073798 A1* | 3/2015 | Karov | G06F 40/289 |
| | | | 704/245 |
| 2016/0328467 A1* | 11/2016 | Zou | G06F 16/36 |
| 2016/0371288 A1* | 12/2016 | Le Biannic | G06F 16/90324 |
| 2017/0147635 A1* | 5/2017 | McAteer | G06F 16/2246 |
| 2017/0310613 A1* | 10/2017 | Lalji | H04L 63/083 |
| 2018/0025726 A1* | 1/2018 | Gatti de Bayser | G10L 15/22 |
| | | | 704/257 |
| 2018/0189389 A1* | 7/2018 | Baldini Soares | G06F 16/9558 |
| 2018/0357221 A1* | 12/2018 | Galitsky | G06F 40/205 |
| 2019/0005025 A1* | 1/2019 | Malabarba | G06F 40/295 |
| 2019/0138646 A1* | 5/2019 | Dechu | G06F 16/3329 |
| 2019/0172454 A1* | 6/2019 | Kitajima | G10L 15/22 |
| 2019/0182382 A1* | 6/2019 | Mazza | G10L 15/26 |
| 2019/0188617 A1* | 6/2019 | Copeland | G06F 16/90335 |
| 2019/0347319 A1* | 11/2019 | Goyal | G10L 15/32 |
| 2019/0347326 A1* | 11/2019 | Kozhaya | H04L 51/02 |

* cited by examiner

METHOD FOR GENERATING CHATBOT UTTERANCE BASED ON SEMANTIC GRAPH DATABASE

CROSS-REFERENCE TO RELATED APPLICATIONS

A claim for priority under 35 U.S.C. § 119 is made to Korean Patent Application No. 10-2018-0081230 filed on Jul. 12, 2018 in the Korean Intellectual Property Office, the entire contents of which are hereby incorporated by reference.

BACKGROUND

Embodiments of the inventive concept described herein relate to a method for generating an utterance of a chatbot based on a semantic graph database.

Nowadays, the demand for natural language processing that enables communication between a human and a chatbot is increasing in various fields such as a personal secretary, a messenger, finance, and distribution. In a chatbot that processes a natural language in real time, a method of storing the entire conversation log obtained through the conversation between a user and the chatbot and processing the information at the request of the user is not suitable for rapid natural language processing due to a large amount of data to be processed. As such, there is a need for a technology to systematically store the information and to process information promptly at the request of the user.

SUMMARY

Embodiments of the inventive concept provide a method for generating an utterance of a chatbot based on a semantic graph database.

Embodiments of the inventive concept provide a systematic and organized method for generating an utterance of a chatbot based on a semantic graph database for the purpose of improving the existing method that fails to perform natural language processing in real time by storing and searching for the entire log of the user's utterance.

The technical objects of the inventive concept are not limited to the above-mentioned ones, and the other unmentioned technical objects will become apparent to those skilled in the art from the following description.

According to an aspect of an embodiment, a method for generating an utterance of a chatbot based on a semantic graph database and executed by a computer, includes generating the semantic graph database by using a past utterance of a user, and generating the utterance of the chatbot for responding to a new utterance of the user, by using the semantic graph database, wherein the generating of the semantic graph database includes: generating a first dependency parse tree for one or more sentences of the past utterance of the user, generating the first dependency parse tree transformed by integrating a predetermined plurality of vertices of the first dependency parse tree into one vertex, depending on a predetermined rule, extracting i) a first object corresponding to a predetermined first vertex, ii) a second object corresponding to a predetermined second vertex, and iii) one or more predetermined first data sets defined as a relationship between the first object and the second object as a third vertex between the first vertex and the second vertex, from the transformed first dependency parse tree, and generating the semantic graph database that takes the first object and the second object of the extracted one or more first data sets as vertices and takes the relationship between the first object and the second object as a directivity edge, wherein the generating of the utterance of the chatbot includes: generating a second dependency parse tree for one or more sentences of the new utterance of the user, generating the second dependency parse tree transformed by integrating a predetermined plurality of vertices of the second dependency parse tree into one vertex, depending on the predetermined rule, extracting i) a first object corresponding to a predetermined first vertex, ii) a second object corresponding to a predetermined second vertex, and iii) one or more predetermined second data sets defined as a relationship between the first object and the second object as a third vertex between the first vertex and the second vertex, from the transformed second dependency parse tree, and extracting one or more first data sets, which are matched with the extracted one or more second data sets, from among the one or more first data sets in the semantic graph database as one or more utterance candidate data sets, generating one or more conversation candidate sentences corresponding to the extracted one or more utterance candidate data sets by using a natural language generation algorithm, and generating the utterance of the chatbot by using the one or more conversation candidate sentences.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

Figure 1:
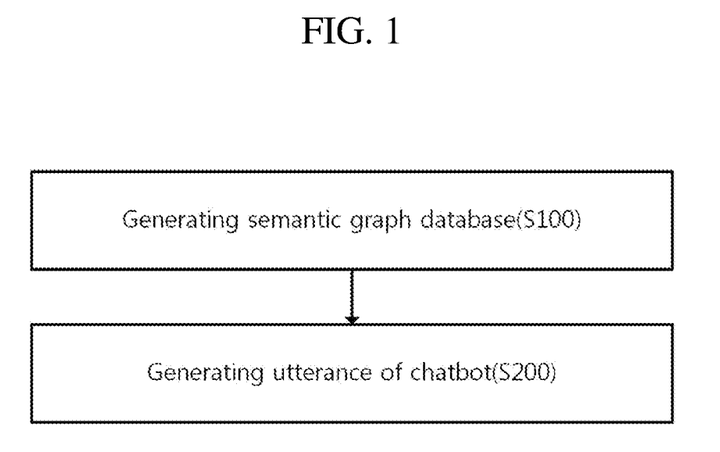
FIG. 1 is a schematic flowchart of a method for generating an utterance of a chatbot based on a semantic graph database, according to an embodiment of the present disclosure.

FIG. 1 is a schematic flowchart of a method for generating an utterance of a chatbot based on a semantic graph database 200, according to an embodiment of the present disclosure.

Referring to FIG. 1, the method for generating the utterance of a chatbot based on a semantic graph database includes operation S100 of generating a semantic graph database 200 and operation S200 of generating the utterance of a chatbot.

In operation S100, a computer generates the semantic graph database 200 by using the user's past utterance.

In operation S200, the computer generates the utterance of the chatbot for responding to the user's new utterance by using the semantic graph database 200.

Figure 2:
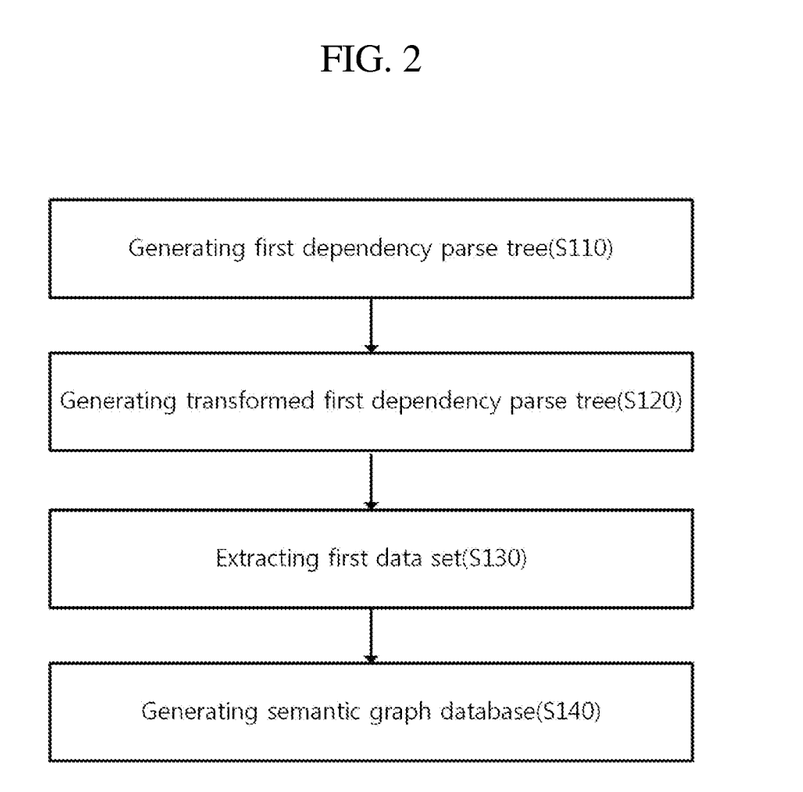
FIG. 2 is a schematic flowchart of a method for generating a semantic graph database, according to an embodiment of the present disclosure.

FIG. 2 is a schematic flowchart of a method for generating the semantic graph database 200, according to an embodiment of the present disclosure.

Referring to FIG. 2, the method for generating the semantic graph database 200 includes operation S110 of generating a first dependency parse tree 100, operation S120 of generating the transformed first dependency parse tree, operation S130 of extracting a first data set, and operation S140 of generating the semantic graph database 200.

In operation S110, the computer generates the first dependency parse tree 100 for one or more sentences of the user's past utterance.

The dependency parse tree 100 has a plurality of vertexes included in one or more sentences of the user's past utterance as a plurality of vertices and connects the plurality of vertices depending on the dependency relationship between a plurality of words.

For example, the dependency relationship between words indicates how words and words are grammatically or semantically related in a sentence as shown in Table 1.

TABLE 1

| Dependency relationship | Explanation | Dependency relationship | Explanation |
|---|---|---|---|
| nsubj | Subject of sentence | det | Definitive |
| dobj | Direct objects | poss | Possessive |
| iobj | Indirect objects | conj | Conjunctive |
| ccomp | Complement of clause | cc | Coordinate conjunction |
| nmod | Modifier of noun | compound | Compound |
| amod | Modifier of adjective | punct | Punctuation |

The dependency parse tree 100 is obvious to those skilled in the art, and detailed description thereof will be omitted because it may obscure the gist of the present disclosure.

In some embodiments, before the first dependency parse tree 100 is generated, when there are a plurality of words that represent the same subject, such as a pronoun, in one or more sentences of the user's past utterance, it is possible to transform the plurality of words so as to be distinguished from pronouns that represent other objects. The same task is performed not only in the pronoun but also in expressions pointing to the demonstrative pronoun and the third party. For example, in a sentence of "Jane likes apple. She is vegetarian." and "Alice goes to mountain. She likes hiking.", "She" of the first sentence indicates "Jane", and "She" of the second sentence indicates "Alice". At this time, "She" of the first sentence and "She" of the second sentence are distinguished by pronouns pointing to different objects, respectively, and thus "She" of the first sentence and "She" of the second sentence are transformed into separate expressions.

In some embodiments, a computer may include words such as "and" 109, "the" 110, "also" 113, and "which" 114, which are conjunctions, articles, adverbs, and definitive, respectively, as a vertex of the dependency parse tree 100.

In operation S120, the computer generates the first dependency parse tree 100 transformed by integrating the predetermined plurality of vertices of the first dependency parse tree into one vertex depending on the predetermined rule.

In some embodiments, when a plurality of words corresponding to the plurality of vertices of the first dependency parse tree 100 are combined with each other to form one meaning, the computer integrates the plurality of vertices into one vertex. For example, when two words are combined to form a compound or when a possessive and a noun are combined, the computer integrates the plurality of vertices into one vertex.

For example, "We" and "grandmother" may be combined and integrated into "our grandmother". Furthermore, "package" and "baggage" may be combined and integrated into "baggage package". Moreover, "come" and "go" may be combined and integrated into "come and go".

An example of a rule for integrating the predetermined plurality of vertices of the dependency parse tree 100 into one vertex is not limited thereto. Other rules not illustrated may be applied.

In operation S130, the computer extracts i) a first object corresponding to a predetermined first vertex, ii) a second object corresponding to a predetermined second vertex, and iii) one or more predetermined first data sets defined as the relationship between the first object and the second object as the third vertex between the first vertex and the second vertex, from the transformed first dependency parse tree.

In some embodiments, the first object and the second object of the one or more first data sets may be nouns or noun phrases, and the relationship between the first object and the second object may be verbs or verb phrases.

In operation S140, the computer generates the semantic graph database 200 that takes the first object and the second object of the extracted one or more first data sets as vertices and takes the relationship between the first object and the second object as a directivity edge.

In some embodiments, the directivity edge may determine the subject of a sentence that will be made in the future, by using the direction of an edge.

In some embodiments, the directivity edge may include not only relationship information between the first object and the second object but also time stamp information of a sentence corresponding to a data set. For example, time information at a point in time when the user utters the sentence corresponding to the data set and the relationship between the first object and the second object is defined may be included in the directivity edge.

In some embodiments, words such as "and" 109, "the" 110, "also" 113, and "which" 114, which are conjunctions, articles, adverbs, and definitive, respectively, may not be included as one vertex of the semantic graph database 200.

Figure 3:
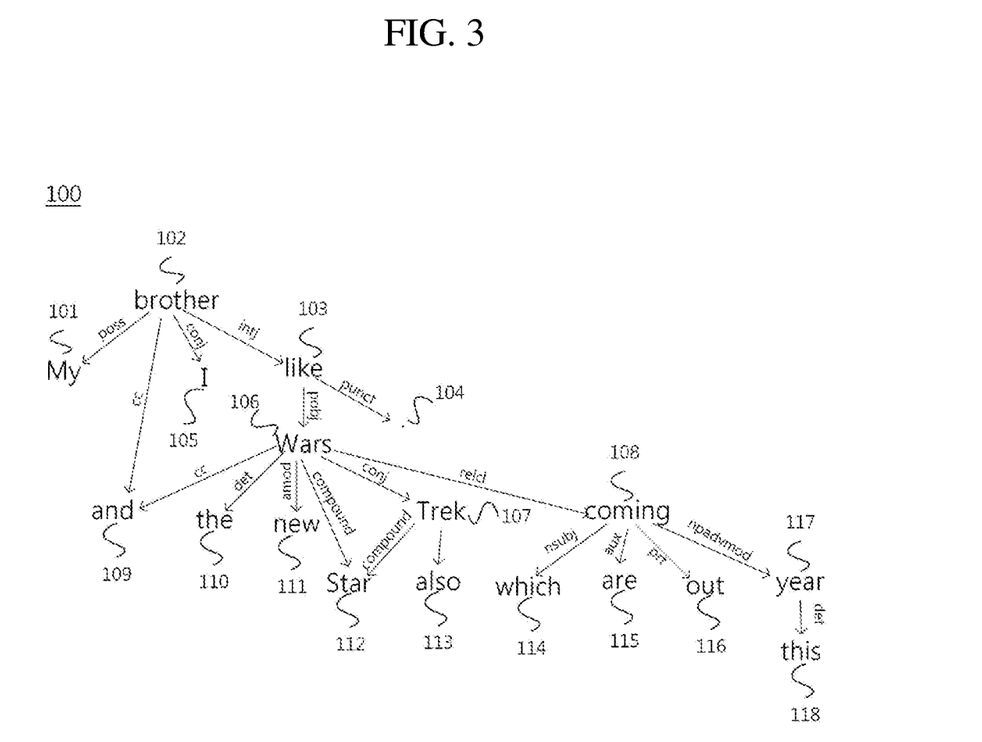
FIG. 3 is a view of a dependency parse tree, according to an embodiment of the present disclosure.

FIG. 3 is a view of the dependency parse tree 100, according to an embodiment of the present disclosure.

Referring to FIG. 3, the dependency parse tree 100 of "My brother and I like the new Star Wars and also Star Trek which are coming out this year.", which is a user's exemplary utterance, is illustrated.

In the exemplary dependency parse tree 100, the sentence of "My brother and I like the new Star Wars and also Star Trek which are coming out this year." is divided into each word and each mark of a sentence such as "My" 101, "brother" 102, "and" 109, "I" 105, "like" 103, "the" 110, "new" 111, "Star" 112, "Wars" 106, "and" 109, "also" 113, "Star" 112, "Trek" 107, "which" 114, "are" 115, "coming" 108, "out" 116, "this" 118, "year" 117, and "." 104.

In the exemplary dependency parse tree 100, each word and each mark of a sentence such as "My" 101, "brother" 102, "and" 109, "I" 105, "like" 103, "the" 110, "new" 111, "Star" 112, "Wars" 106, "and" 109, "also" 113, "Star" 112, "Trek" 107, "which" 114, "are" 115, "coming" 108, "out" 116, "this" 118, "year" 117, and "." 104 may become a vertex, and the dependency relationship of each word is connected to the directivity edge. For example, "My" 101 and "brother" 102 are analyzed as having a possessive relationship; "brother" 102 and "I" 105 are analyzed as having a conjunctive relationship; "Star" 112 and "Wars" 106 are analyzed as having a compound relationship; "My" 101 and "brother" 102, "brother" 102 and "I" 105, and "Star" 112 and "Wars" 106 are connected by the directivity edge.

As described above, the predetermined plurality of vertices of the dependency parse tree 100 may be transformed after being integrated into one vertex. In the exemplary dependency parse tree 100, "My" 101 and "brother" 102 may be integrated into "My brother" 202 after being combined. In addition, "Star" 112 and "Trek" 107 may be integrated into "Star Trek" 204 after being combined. Furthermore, "are" 115, "coming" 108, and "out" 116 may be integrated into "are coming out" after being combined.

Figure 4:
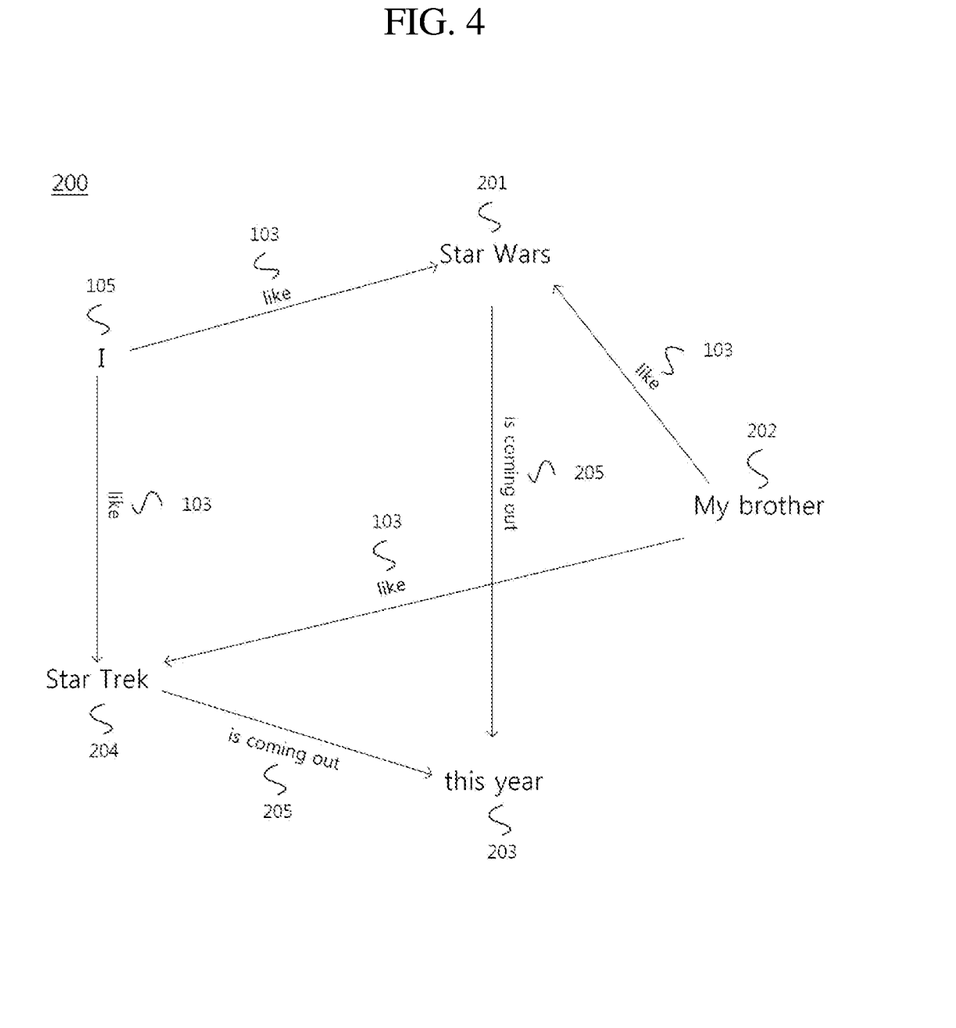
FIG. 4 is a view of a semantic graph database, according to an embodiment of the present disclosure.

FIG. 4 is a view of the semantic graph database 200, according to an embodiment of the present disclosure.

Referring to FIG. 4, a computer extracts a data set from the dependency parse tree 100 of "My brother and I like the new Star Wars and also Star Trek which are coming out this year." being a user's exemplary utterance and generates the semantic graph database 200 in which the extracted data set is a vertex and a directivity edge.

In some embodiments, "I" 105, "Star Wars" 201, "My brother" 202, "Star Trek" 204, and "this year" 203 which are nouns and noun phrases in the exemplary extracted data set are disposed as each vertex of the semantic graph database 200. Moreover, "like" 103 and "is coming out" being a verb and a verb phrase are interposed between vertices of the semantic graph database 200 as the directivity edge.

In some embodiments, the directivity edge of "is coming out" is disposed in the vertex direction of "this year" 203 from the vertex of "Star Wars" 201. Since the directivity edge determines the subject of a sentence, a sentence such as "Star Wars is coming this year" may be made by using the vertices of "Star Wars" 201 and "this year" 203 and the directivity edge of "is coming out".

In some embodiments, the computer may include information such as a time stamp in the directivity edge. For example, the user allows time information at a point in time when the vertices of "Star Wars" 201 and "this year" 203 are used, to be included in the directivity edge of "is coming out".

Figure 5:
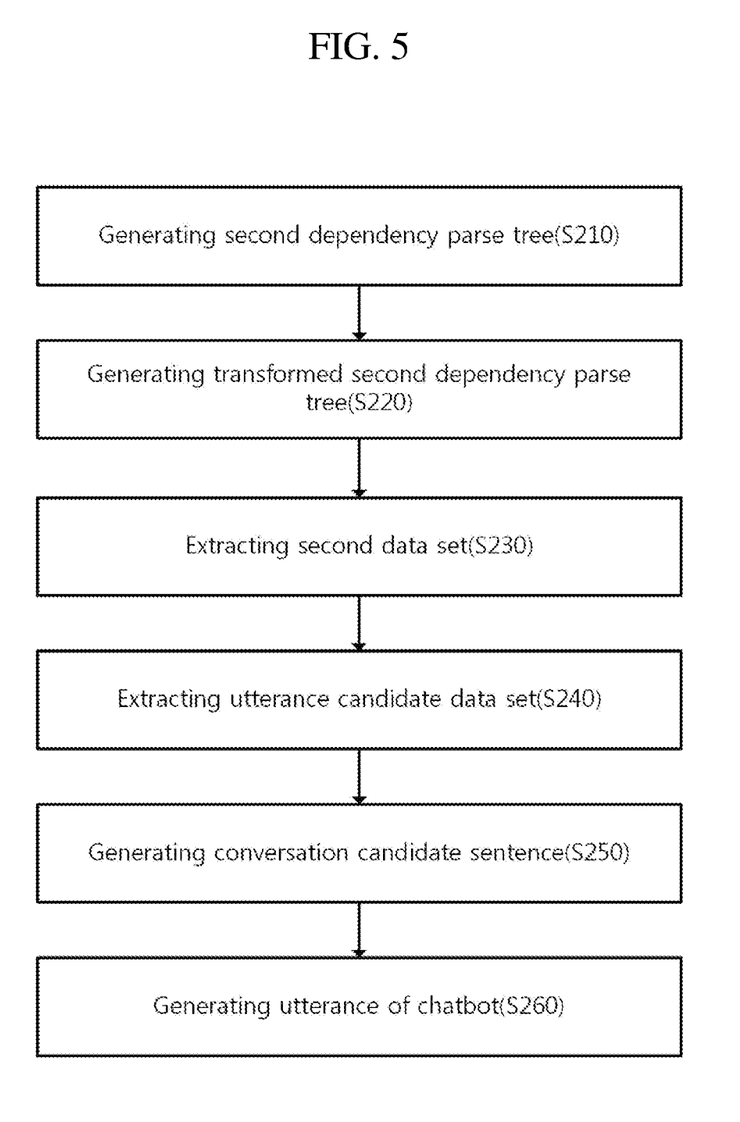
FIG. 5 is a schematic flowchart of a method of generating an utterance of a chatbot, according to an embodiment of the present disclosure.

FIG. 5 is a schematic flowchart of a method of generating an utterance of a chatbot, according to an embodiment of the present disclosure.

Referring to FIG. 5, a method of generating an utterance of a chatbot includes operation S210 of generating the second dependency parse tree 100, operation S220 of generating the transformed second dependency parse tree, operation S230 of extracting a second triple unit, operation S240 of extracting an utterance candidate triple unit, operation S250 of generating a conversation candidate sentence, and operation S260 of generating the utterance of the chatbot.

In operation S210, a computer generates the second dependency parse tree 100 for one or more sentences of a user's new utterance.

In operation S220, the computer generates the second dependency parse tree transformed by integrating the predetermined plurality of vertices of the second dependency parse tree 100 into one vertex depending on the predetermined rule.

In some embodiments, when a plurality of words corresponding to the plurality of vertices of the second dependency parse tree 100 are combined with each other to form one meaning, the computer integrates the plurality of vertices into one vertex. For example, when two words are combined to form a compound or when a possessive and a noun are combined, the computer integrates the plurality of vertices into one vertex.

In some embodiments, the first object and the second object of the one or more second data sets may be noun phrases, and the relationship between the first object and the second object may be a verb phrase.

In operation S230, the computer extracts i) a first object corresponding to a predetermined first vertex, ii) a second object corresponding to a predetermined second vertex, and iii) one or more predetermined second data sets defined as the relationship between the first object and the second object as the third vertex between the first vertex and the second vertex, from the transformed second dependency parse tree.

In operation S240, the computer extracts one or more first data sets, which are matched with the extracted one or more second data sets, from among one or more first data sets in the semantic graph database 200 as one or more utterance candidate data sets.

In some embodiments, the utterance candidate data set is extracted by using a 3-dimensional (3D) loss function. The 3D loss function takes a first data set and a second data set as inputs and returns the distance between each element of the first data set and the second data set.

The distance between each element returned by the 3D loss function may be expressed in the form of [dist1(object 11, object 21), dist2(relationship 1, relationship 2), dist3(object 12, object 22)].

Herein, dist(A, B) calculates the distance between A and B vectors. For example, the dist computes the cosine similarity for measuring the degree of similarity between the measured vectors by using the cosine value of the angle between the A and B vectors of the inner space.

The object 11 is the first object of the first data set; the object 21 is the first object of the second data set; the object 12 is the second object of the first data set; and the object 22 is the second object of the second data set.

The relationship 1 is the relationship between the first object and the second object in the first data set; and the relationship 2 is the relationship between the first object and the second object in the second data set.

Moreover, the first data set, which has the smallest sum of dist1, dist2, and dist3 and which minimizes the return value of the loss function, may be selected as the candidate data set to be generated as the following conversation candidate sentence. When a plurality of second data sets are extracted in operation S230, a plurality of candidate data sets may be extracted.

In operation S250, the computer generates one or more conversation candidate sentences corresponding to the extracted one or more utterance candidate data sets by using a natural language generation algorithm. Various algorithms well known in the art may be used as the natural language generation algorithm.

In operation S260, the computer generates the utterance of the chatbot by using one or more candidate sentences.

In some embodiments, when generating the utterance of the chatbot by using one or more candidate sentences, the computer calculates the evaluation score of one or more candidate sentences for the context of the conversation between the user and the chatbot and the user's new utterance, by using a deep learning algorithm. The computer generates the utterance of the chatbot by using one or more candidate sentences in each of which the calculated evaluation score is not less than a predetermined reference value.

In some embodiments, the computer makes a context string of the entire conversation between the user and the chatbot with respect to the user's new utterance. For example, the context string may be a connection of words from the user's past utterance to the new utterance in the entire conversation.

In some embodiments, the computer calculates the evaluation score of the candidate sentence generated in operation S250, by using a pre-trained score system using deep learning. The score system receives the format of [a context string, user's new utterance, a candidate sentence], and calculates an evaluation score of the candidate sentence generated in operation S250 based on the context string and the user's new utterance.

In some embodiments, the computer may generate the utterance of a chatbot using the candidate sentence with a high evaluation score.

Figure 6:
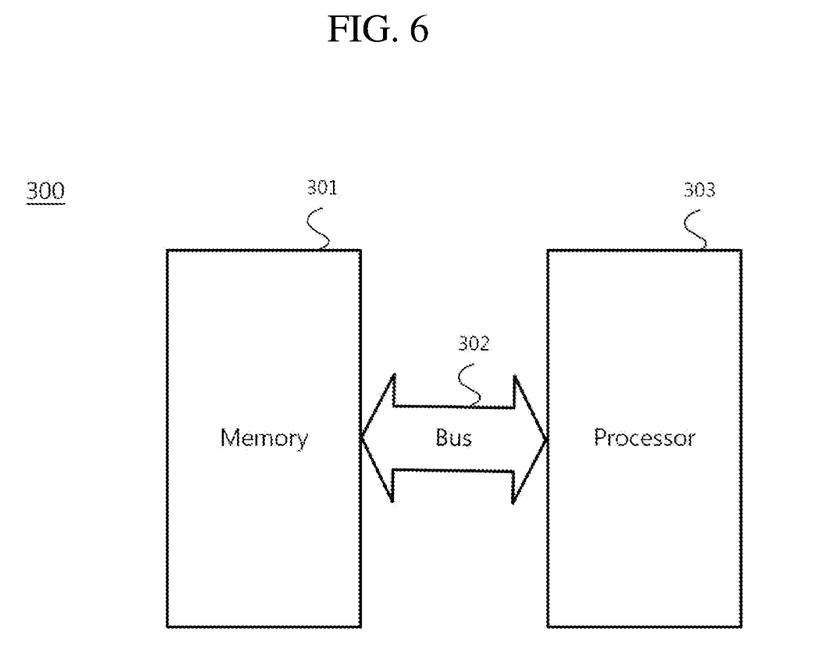
FIG. 6 is a schematic block diagram of a computer system generating a chatbot service program, according to an embodiment of the present disclosure.

FIG. 6 is a schematic block diagram of a computer system 300 generating a chatbot service program, according to an embodiment of the present disclosure.

Referring to FIG. 6, the computer system 300 generating a chatbot service program includes a memory 301, a bus 302, and a processor 303.

The memory 301 stores instructions and data for executing a method of generating an utterance of a chatbot based on the semantic graph database 200 described above.

The processor 303 analyzes and computes the instructions and the data stored in the memory 301, and outputs the computed result to the chatbot engine of the chatbot system 400.

The bus 302 connects the memory 301 to the processor 303 to transmit the instructions and the data.

Figure 7:
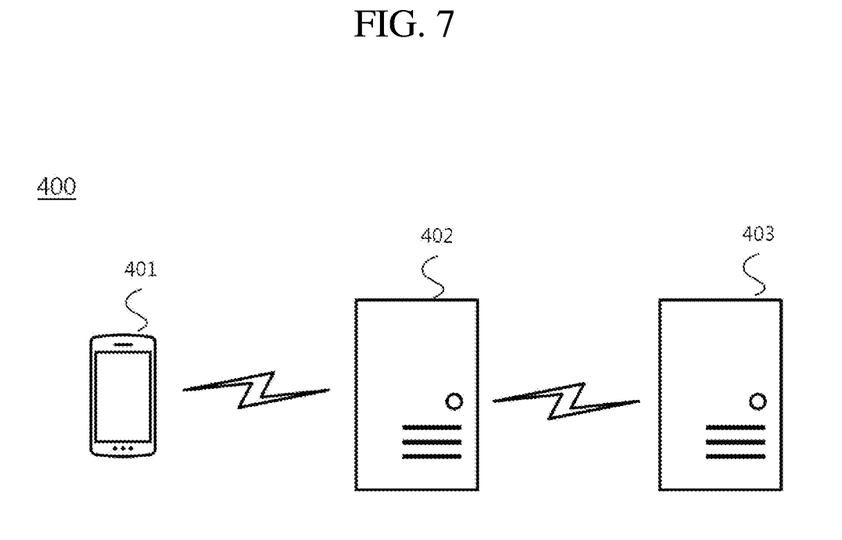
FIG. 7 is a view illustrating a chatbot system generating an utterance of a chatbot, according to an embodiment of the present disclosure.

FIG. 7 is a view illustrating a chatbot system 400 generating an utterance of a chatbot, according to an embodiment of the present disclosure.

Referring to FIG. 7, the chatbot system 400 generating an utterance of a chatbot includes a user terminal 401, a service server 402, and a chatbot server 403.

The service server 402 provides a user with a chatbot service; when the user's utterance is entered into the user terminal 401, the user's utterance is transmitted to the chatbot server 403.

The chatbot server 403 may include the chatbot engine and a database. The chatbot engine is the method of generating the utterance of the chatbot based on the above-described semantic graph database 200 and generates the utterance of a chatbot from the user's utterance. The database stores the user's utterance transmitted from the service server and transmits the user's utterance to the chatbot engine upon generating the utterance of the chatbot.

In some embodiments, the above-discussed method of FIG. 1, 2, 5, according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIG. 1, 2, 5 according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to the method for generating an utterance of a chatbot based on a semantic graph database of the present disclosure, the past utterance of the user may be embedded into the semantic graph database and stored in a systematic and organized manner.

Furthermore, the method may not store unnecessary words by making the user's utterance as a semantic graph database; alternatively, when a plurality of words are combined to form one meaning, the method may store the combined words as a collection of words. In this way, it may quickly search for the user's past utterance and generate the utterance of the chatbot when the user's response is needed, because it is possible to reduce the data amount of the user's past utterance to be stored. Accordingly, it is possible to have a real-time conversation between the user and the chatbot.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for generating an utterance of a chatbot based on a semantic graph database and executed by a computer, the method comprising:
    generating the semantic graph database by using a past utterance of a user; and
    generating the utterance of the chatbot for responding to a new utterance of the user, by using the generated semantic graph database,
    wherein the generating the semantic graph database comprises:
        generating a first dependency parse tree for one or more sentences of the past utterance of the user;
        generating a first transformed dependency parse tree by integrating a plurality of vertices of the first dependency parse tree into one vertex, according to a predetermined rule;
        extracting:
            a first object corresponding to a first vertex of the first transformed dependency parse tree;
            a second object corresponding to a second vertex of the first transformed dependency parse tree; and
            information regarding a relationship between the first object and the second object as a third vertex between the first vertex and the second vertex, from the first transformed dependency parse tree;
        generating one or more first data sets including the first object, the second object, and the information regarding the relationship between the first object and the second object; and
        generating, based on the one or more first data sets, the semantic graph database that identifies:
            a first vertex of the semantic graph database, which corresponds to the first object;
            a second vertex of the semantic graph database, which corresponds to the second object;
            a directivity edge including the information regarding the relationship between the first object and the second object, wherein the directivity edge is directed from a subject element of a sentence, among the first object and the second object, toward a non-subject element of the sentence, among the first object and the second object,
    wherein the generating the utterance of the chatbot comprises:
        generating a second dependency parse tree for one or more sentences of the new utterance of the user;
        generating a second transformed dependency parse tree by integrating a plurality of vertices of the second dependency parse tree into one vertex, according to the predetermined rule;
        extracting:
            a third object corresponding to a first vertex of the second transformed dependency parse tree;
            a fourth object corresponding to a second vertex of the second transformed dependency parse tree; and
            information regarding a relationship between the third object and the fourth object as a third vertex of the second transformed dependency parse tree, between the first vertex and the second vertex of the second transformed dependency parse tree, from the second transformed dependency parse tree;
        generating one or more second data sets including the third object, the fourth object, and the information regarding the relationship between the third object and the fourth object; and
        extracting, among the one or more first data sets, one or more data sets, which are matched with the one or more second data sets, as one or more utterance candidate data sets;
        generating one or more conversation candidate sentences based on the one or more utterance candidate data sets by using a natural language generation algorithm; and
        generating the utterance of the chatbot by using the one or more conversation candidate sentences,
    wherein the generating, based on the one or more first data sets, the semantic graph database comprises:
        causing the directivity edge to include relationship information between the first object and the second object and time stamp information indicating a point in time when each element of the one or more sentences of the past utterance of the user is spoken.

2. The method of claim 1, wherein the generating the first transformed dependency parse tree comprises:
    when a plurality of words corresponding to the plurality of vertices of the first dependency parse tree are combined with each other to form one meaning, integrating the plurality of vertices of the first dependency parse tree into one vertex.

3. The method of claim 1, wherein each of the first object and the second object of the one or more first data sets is a noun phrase, and
    wherein the relationship between the first object and the second object is defined as a verb phrase.

4. The method of claim 1, wherein the generating the second transformed dependency parse tree comprises:
    when a plurality of words corresponding to the plurality of vertices of the second dependency parse tree are combined with each other to form one meaning, integrating the plurality of vertices of the second dependency parse tree into one vertex.

5. The method of claim 1, wherein each of the third object and the fourth object of the one or more second data sets is a noun phrase, and
wherein the relationship between the third object and the fourth object is defined as a verb phrase.

6. The method of claim 1, wherein the extracting, among the one or more first data sets, one or more data set comprises:
extracting the one or more utterance candidate data sets by using a 3-dimensional loss function.

7. The method of claim 6, wherein the 3-dimensional loss function takes the one or more first data sets and the one or more second data sets as inputs and returns a distance between each element of the one or more first data sets and the one or more second data sets.

8. The method of claim 1, wherein the generating the utterance of the chatbot by using the one or more conversation candidate sentences comprises:
calculating an evaluation score of the one or more conversation candidate sentences for a context of a conversation between the user and the chatbot and the new utterance of the user, by using a deep learning algorithm; and
generating the utterance of the chatbot by using the one or more conversation candidate sentences in each of which the evaluation score is not less than a predetermined reference value.

9. A non-transitory computer-readable recording medium storing a program for generating an utterance of a chatbot based on a semantic graph database, and configured to be coupled to a computer being hardware, the program include instructions to execute a method comprising:
generating the semantic graph database by using a past utterance of a user; and
generating the utterance of the chatbot for responding to a new utterance of the user, by using the generated semantic graph database,
wherein the generating the semantic graph database comprises:
generating a first dependency parse tree for one or more sentences of the past utterance of the user;
generating a first transformed dependency parse tree by integrating a plurality of vertices of the first dependency parse tree into one vertex, according to a predetermined rule;
extracting:
a first object corresponding to a first vertex of the first transformed dependency parse tree;
a second object corresponding to a second vertex of the first transformed dependency parse tree; and
information regarding a relationship between the first object and the second object as a third vertex between the first vertex and the second vertex, from the first transformed dependency parse tree;
generating one or more first data sets including the first object, the second object, and the information regarding the relationship between the first object and the second object; and
generating, based on the one or more first data sets, the semantic graph database that identifies:
a first vertex of the semantic graph database, which corresponds to the first object;
a second vertex of the semantic graph database, which corresponds to the second object;
a directivity edge including the information regarding the relationship between the first object and the second object, wherein the directivity edge is directed from a subject element of a sentence, among the first object and the second object, toward a non-subject element of the sentence, among the first object and the second object,
wherein the generating the utterance of the chatbot comprises:
generating a second dependency parse tree for one or more sentences of the new utterance of the user;
generating a second transformed dependency parse tree by integrating a plurality of vertices of the second dependency parse tree into one vertex, according to the predetermined rule;
extracting:
a third object corresponding to a first vertex of the second transformed dependency parse tree;
a fourth object corresponding to a second vertex of the second transformed dependency parse tree; and
information regarding a relationship between the third object and the fourth object as a third vertex of the second transformed dependency parse tree, between the first vertex and the second vertex of the second transformed dependency parse tree, from the second transformed dependency parse tree;
generating one or more second data sets including the third object, the fourth object, and the information regarding the relationship between the third object and the fourth object; and
extracting, among the one or more first data sets, one or more data sets which are matched with the one or more second data sets, as one or more utterance candidate data sets;
generating one or more conversation candidate sentences based on the one or more utterance candidate data sets by using a natural language generation algorithm; and
generating the utterance of the chatbot by using the one or more conversation candidate sentences,
wherein the generating, based on the one or more first data sets, the semantic graph database comprises:
causing the directivity edge to include relationship information between the first object and the second object and time stamp information indicating a point in time when each element of the one or more sentences of the past utterance of the user is spoken.

10. The method of claim 1, wherein the information regarding the relationship between the first object and the second object comprises at least one identifier selected from the group consisting of:
"nsubj" identifier that indicates subject of sentence;
"det" identifier that indicates definitive;
"dobj" identifier that indicates direct object;
"poss" identifier that indicates possessive;
"iobj" identifier that indicates indirect object;
"conj" identifier that indicates conjunctive;
"ccomp" identifier that indicates complement of clause;
"cc" identifier that indicates coordinate conjunction;
"nmod" identifier that indicates modifier of noun;
"compound" identifier that indicates compound;
"amod" identifier that indicates modifier of adjective; and
"punct" identifier that indicates punctuation.

11. The method of claim 1, wherein the information regarding the relationship between the third object and the fourth object comprises at least one identifier selected from the group consisting of:
"nsubj" identifier that indicates subject of sentence;

"det" identifier that indicates definitive;
"dobj" identifier that indicates direct object;
"poss" identifier that indicates possessive;
"iobj" identifier that indicates indirect object;
"conj" identifier that indicates conjunctive;
"ccomp" identifier that indicates complement of clause;
"cc" identifier that indicates coordinate conjunction;
"nmod" identifier that indicates modifier of noun;
"compound" identifier that indicates compound;
"amod" identifier that indicates modifier of adjective; and
"punct" identifier that indicates punctuation.

12. The non-transitory computer-readable recording medium of claim 9, wherein the information regarding the relationship between the first object and the second object comprises at least one identifier selected from the group consisting of:
"nsubj" identifier that indicates subject of sentence;
"det" identifier that indicates definitive;
"dobj" identifier that indicates direct object;
"poss" identifier that indicates possessive;
"iobj" identifier that indicates indirect object;
"conj" identifier that indicates conjunctive;
"ccomp" identifier that indicates complement of clause;
"cc" identifier that indicates coordinate conjunction;
"nmod" identifier that indicates modifier of noun;
"compound" identifier that indicates compound;
"amod" identifier that indicates modifier of adjective; and
"punct" identifier that indicates punctuation.

13. The non-transitory computer-readable recording medium of claim 9, wherein the information regarding the relationship between the third object and the fourth object comprises at least one identifier selected from the group consisting of:
"nsubj" identifier that indicates subject of sentence;
"det" identifier that indicates definitive;
"dobj" identifier that indicates direct object;
"poss" identifier that indicates possessive;
"iobj" identifier that indicates indirect object;
"conj" identifier that indicates conjunctive;
"ccomp" identifier that indicates complement of clause;
"cc" identifier that indicates coordinate conjunction;
"nmod" identifier that indicates modifier of noun;
"compound" identifier that indicates compound;
"amod" identifier that indicates modifier of adjective; and
"punct" identifier that indicates punctuation.

* * * * *